US010631471B2

(12) United States Patent
Lamoureux et al.

(10) Patent No.: US 10,631,471 B2
(45) Date of Patent: Apr. 28, 2020

(54) METHOD AND SYSTEM FOR INCREASING DAYS FOR THE CULTIVATION OF PARTICULAR FRUIT BEARING VINES IN UNFAVOURABLE CLIMATIC REGIONS

(71) Applicants: Normand Lamoureux, Dunham (CA); Christian Thomas, Sutton (CA)

(72) Inventors: Normand Lamoureux, Dunham (CA); Christian Thomas, Sutton (CA)

(73) Assignee: Normand Lamoureux, Dunham, QC (CA)

( * ) Notice: Subject to any disclaimer, the term of this patent is extended or adjusted under 35 U.S.C. 154(b) by 109 days.

(21) Appl. No.: 14/392,075

(22) PCT Filed: Nov. 19, 2014

(86) PCT No.: PCT/CA2014/000833
§ 371 (c)(1),
(2) Date: Sep. 10, 2015

(87) PCT Pub. No.: WO2016/077905
PCT Pub. Date: May 26, 2016

(65) Prior Publication Data
US 2018/0177141 A1  Jun. 28, 2018

(51) Int. Cl.
*A01G 13/06* (2006.01)
*A01G 17/00* (2006.01)
(Continued)

(52) U.S. Cl.
CPC ......... *A01G 13/06* (2013.01); *A01G 13/0231* (2013.01); *A01G 17/005* (2013.01);
(Continued)

(58) Field of Classification Search
CPC ........ A01G 13/06; A01G 13/00; A01G 13/02; A01G 13/0206; A01G 13/0212;
(Continued)

(56) References Cited

U.S. PATENT DOCUMENTS 1,758,941 A * 5/1930 Gibson ................ A01G 13/065
126/59.5
2,155,184 A * 4/1939 Fujiura .................. A01G 13/06
126/59.5
(Continued)

FOREIGN PATENT DOCUMENTS

CA  2509278 A1 * 12/2006 ............. A01G 13/06
DE  1059230 B  *  6/1959 ......... A01G 13/0231
(Continued)

OTHER PUBLICATIONS

Machine translation of ES 2208052 to Vicente, published Jun. 2004.*

*Primary Examiner* — Kathleen I Alker
(74) *Attorney, Agent, or Firm* — Guy J. Houle; Houle Patent Agency Inc.

(57) ABSTRACT

A method and a system for increasing the degree days in the immediate environment of fruit bearing vines for the cultivation of particular fruit bearing vines, such as non-rustic vinifera variety vines, in unfavourable climatic regions where the degree days is insufficient for the full maturity of the fruit, is described. Rows of the vines are protected in removable shelters which have a removable tarp cover disposed over a support frame structure to shield the rows of vines from the harsh, vine damaging, winter month temperatures while keeping the vines in a controlled temperature environment. Heated liquid circulation conduits are supported in the shelters at predetermined locations and provide controlled heat during the winter months to prevent the vines and the cordon bearing spuds of the vines from damaging cold temperatures. In the early spring the roots are activated early and the tarp is removed and a transparent film sheet covering is substituted to admit sunlight to help activate the vine early to gain degree days. The method and system is also applicable to semi-rustic or rustic wine
(Continued)

producing grape vines grown in these climatic regions having degree days down to about 1200.

13 Claims, 5 Drawing Sheets

(51) Int. Cl.
| | |
|---|---|
| *A01G 13/02* | (2006.01) |
| *A01G 22/05* | (2018.01) |
| *A01G 17/02* | (2006.01) |
| *E04H 15/12* | (2006.01) |
| *E04H 15/36* | (2006.01) |
| *E04H 15/54* | (2006.01) |
| *E04H 15/62* | (2006.01) |
| *F24H 9/20* | (2006.01) |
| *A01G 9/24* | (2006.01) |

(52) U.S. Cl.
CPC ............ *A01G 17/02* (2013.01); *A01G 22/05* (2018.02); *E04H 15/12* (2013.01); *E04H 15/36* (2013.01); *E04H 15/54* (2013.01); *E04H 15/62* (2013.01); *F24H 9/2007* (2013.01); *A01G 9/246* (2013.01); *Y02A 40/268* (2018.01)

(58) Field of Classification Search
CPC ............ A01G 13/0231; A01G 13/0237; A01G 13/04; A01G 13/043; A01G 17/02; A01G 17/04; A01G 17/06; A01G 2017/065; A01G 17/14; A01G 17/005; A01G 22/05; A01G 9/1438; A01G 9/24; A01G 9/245; A01G 9/2416; E04H 15/12; E04H 15/34; E04H 15/36; E04H 15/54; E04H 15/62
See application file for complete search history.

(56) References Cited

U.S. PATENT DOCUMENTS

| | | | | |
|---|---|---|---|---|
| 2,350,621 | A * | 6/1944 | Kasser | A01G 13/06 126/59.5 |
| 2,889,664 | A * | 6/1959 | Olshansky | B21D 7/06 47/29.1 |
| 3,088,244 | A * | 5/1963 | Commisso | A01G 13/0231 135/115 |
| 3,244,186 | A * | 4/1966 | Thomason | E04H 3/16 135/100 |
| 4,020,591 | A * | 5/1977 | Seffinga | A01G 9/1407 47/29.1 |
| 4,216,614 | A * | 8/1980 | Triplett | A01G 13/06 126/59.5 |
| 4,223,666 | A * | 9/1980 | Wasserman | A01G 9/243 126/618 |
| 4,416,928 | A * | 11/1983 | Carl | A01G 9/1438 428/38 |
| 4,442,626 | A * | 4/1984 | Hammond | A01G 13/0231 135/119 |
| 4,556,103 | A * | 12/1985 | Kuwa | A01G 9/24 165/122 |
| 4,646,467 | A * | 3/1987 | Morrisroe | A01G 13/043 47/20.1 |
| 4,651,465 | A | 3/1987 | Lilly | |
| 4,662,105 | A | 5/1987 | LaGow | |
| 4,665,646 | A * | 5/1987 | Anderson | A01G 13/043 47/21.1 |
| 4,679,350 | A * | 7/1987 | Banta | A01G 13/0231 47/17 |
| 4,885,879 | A * | 12/1989 | Plantier | E01F 7/02 52/63 |
| 4,901,472 | A * | 2/1990 | Donohue | A01G 13/0237 126/263.02 |
| 5,144,768 | A | 9/1992 | Hiyama et al. | |
| 5,179,798 | A * | 1/1993 | Sonagere | A01G 13/0231 47/29.1 |
| 5,692,337 | A | 12/1997 | Motz, Jr. | |
| 6,578,318 | B1 * | 6/2003 | Clark | A01G 17/005 47/58.1 FV |
| 7,818,915 | B1 * | 10/2010 | Flaishman | A01G 17/06 47/1.43 |
| D659,587 | S * | 5/2012 | Willsie | D11/145 |
| 2002/0050095 | A1 * | 5/2002 | McMullin | A01G 13/0268 47/17 |
| 2006/0150492 | A1 * | 7/2006 | Kaprielian | A01G 13/043 47/58.1 SC |
| 2008/0120901 | A1 * | 5/2008 | Hinsperger | A01G 13/0268 47/20.1 |
| 2009/0049742 | A1 * | 2/2009 | Ilan | A01G 9/1438 47/31 |
| 2009/0133325 | A1 * | 5/2009 | Kraminer | A01G 9/24 47/31.1 |
| 2011/0247264 | A1 | 10/2011 | Luciano, Jr. | |
| 2013/0125946 | A1 * | 5/2013 | Bourdon | E04H 15/64 135/121 |
| 2013/0160357 | A1 | 6/2013 | Luciano | |
| 2014/0245661 | A1 * | 9/2014 | Saumweber | A01G 9/243 47/17 |
| 2014/0311025 | A1 * | 10/2014 | Pauls | A01G 9/24 47/17 |

FOREIGN PATENT DOCUMENTS

| | | | | |
|---|---|---|---|---|
| DE | 10252140 | A1 * | 5/2004 | ............ A01G 9/24 |
| DE | 102004010625 | A1 * | 9/2005 | ............ A01G 13/04 |
| EP | 0640279 | A1 * | 3/1995 | ............ A01G 9/227 |
| ES | 2158831 | A1 * | 9/2001 | ............ A01G 13/065 |
| ES | 2208052 | A1 * | 6/2004 | ............ A01G 13/06 |
| FR | 2304280 | A2 * | 10/1976 | ............ A01G 9/245 |
| FR | 2343418 | A1 * | 11/1977 | ........ A01G 13/0231 |
| FR | 2778061 | B1 * | 6/2000 | ........ A01G 13/0231 |
| FR | 2999381 | A1 * | 6/2014 | ........ A01G 13/0206 |
| GB | 741029 | A * | 11/1955 | ............ A01G 13/043 |
| GB | 782115 | A * | 9/1957 | ........ A01G 13/0206 |
| WO | WO-2013082873 | A1 * | 6/2013 | ............ A01G 9/245 |
| WO | WO-2013083936 | A1 * | 6/2013 | ............ A01G 9/243 |
| WO | WO-2016012525 | A1 * | 1/2016 | ............ A01G 13/06 |

* cited by examiner

METHOD AND SYSTEM FOR INCREASING DAYS FOR THE CULTIVATION OF PARTICULAR FRUIT BEARING VINES IN UNFAVOURABLE CLIMATIC REGIONS

TECHNICAL FIELD

The present invention relates to a method and a system for increasing the degree days in the immediate environment of fruit producing vines for the cultivation of particular fruit bearing vines, and particularly wine producing grape vines, such as rustic, semi-rustic or the non-rustic vinifera variety vines in unfavourable climatic regions where the degree days is insufficient for the full maturity of the fruit.

BACKGROUND ART

Natural factors make wine from particular regions unique, such regions known in the industry as "terroir". These factors include various factors such as local climate, location of grapevines and soil composition and water drainage. Fruit bearing vines produces best fruits when climatic conditions are ideal such as lots of sunshine and cool nights without frost or hailstorms. In selecting a grape cultivar, one must consider the number of growing degree days, the length of the growing season and the frequency of exposure to low temperatures. The time required to mature grapes varies with location and climatic conditions and is dependent on the amount of heat experience by the vine. The frequency of very cold weather in winter will determine the survival of the vines.

The growing degree day (GDD) is used to calculate the amount of heat received in a region. It is calculated as the daily average temperature (max plus Min/2) minus the base temperature of 50 degrees F. below which grapes will not grow. Weather statics for climatic regions are provided by weather bureaus throughout the world.

Many variety types of grapes are grown in many regions of the world to produce grape juice, edible grapes, and wine of varying quality. Various grape vine varieties can resist to harsh climatic conditions where the winters are cold and the ground is covered with snow. Often, extra care is necessary to protect the vines during these cold winter climatic conditions. For example, rustic type grape vines are cultivated in regions where the degree days never exceed about 1200. In view of such cold climatic conditions the growers cannot grow quality wines, such as the vinifera variety grape vine which use the European technique of cultivation which consists in preserving the cordons on the vine cane with a few spuds during cold winter months. The European technique achieves a grape having a level of maturity which permits the production of a wine of superior quality as we find in Europe and the State of California.

Various methods have been used in an attempt to grow non-rustic vinifera type grape vines in unfavourable climatic regions. Such methods including, for example, cutting the cordons of the vine at the top of the cane every year as the wood cannot survive the cold winter months. The cane is thereafter covered by a thick layer of manure, earth, straw and a geo-textile fabric in order to protect the cane and the roots against temperature drops below minus 10 degrees Celsius. Such techniques pose a certain risk of losing the entire vine and are labour intensive in the fall and spring time period to cover and uncover the canes of the vines adding to cost. Also, there is the further risk against frost during spring time when unexpected cold weather can occur, and late fall when the grapes are still on the vines without protection against frost.

With reference to some published prior art, Chinese patent CN101563997 discloses a method of cultivation of grape vines offering protection against frost. It consists of covering the vines with earth and mulch and laying a plastic film over the vines with a sun-shading net disposed over the vines. In the spring. The covering is removed and the vines are unearthed and sprayed with a lime stone sulfur mixture. Such method, it is said permits temperature increasing and stabilizing, wind prevention and late frosting prevention. However, there is no form of controlling temperature as unregulated high temperature or low temperature can result in damage to the vines and poor crops.

US Patent Publication 2011/0247264, published on Oct. 13, 2011, discloses a trellis system for irrigation and frost prevention of agricultural plants. Heated water is sprayed and provides drip irrigation to an area surrounding the trellis system of plants to prevent the development of damaging frost. A protective net of fabric or plastic mesh is supported by the trellis and unfurled to partially or fully cover the plant to offer protection due to cold weather. When the temperature drops below 34 degrees F., a controller operates the hot water spraying system to prevent against frost damage.

U.S. Pat. No. 4,651,465 discloses another system for frost prevention of plants and especially citrus trees. A circulating water conduit is placed adjacent the tree trunk within a thermal barrier which is sealed at the top about the tree trunk and open at the bottom where the conduits enter the barrier. The conduit supplies heat to the space about the trunk and pours water onto the ground or sprays water over the tree to protect against freezing.

SUMMARY OF THE INVENTION

It is a feature of the present invention to provide a method and a system for increasing degree days in the immediate environment of fruit bearing vines in unfavourable climatic regions and particularly for the cultivation of wine producing grape vines in such unfavourable regions.

Another feature of the present invention is to provide a method and system for the production of superior quality wine in climatic regions having inferior degree days for the cultivation of non-rustic vinifera cultivars of Chardonnay, Gewerztraminer. Riesling, Pinot, Merlot and Cabernet Sauvignon.

Another feature of the present invention is to provide a method and a system to precipitate early spring activation of the roots of wine producing grape vines and particularly vinifera vines whereby to prolong ripening of the grapes of the vines to maturity in unfavourable climatic regions and thereby extending the degree days required for the cultivation of the particular type of grapes.

A still further feature of the present invention is to provide a method and a system using wholly or in part, available geothermal energy and or other energy sources to provide heat in tunnel-like removable shelters each containing rows of wine producing grape vines to protect the vines and its root and cordon(s) during the cold winter months.

Another feature of the present invention is to provide a method and system for the cultivation of vinifera variety grape vines in climatic regions averaging about 1200 degree days by increasing the climatic conditions in the immediate environment of the vines ideally to between 1400 to about 1600 degree days.

According to the above features, from a broad aspect, the present invention provides a method for increasing the degree days for the cultivation of particular fruits produced by fruit bearing vines in an unfavourable climatic region for the cultivation of said fruits. The method comprises the steps of sheltering rows of vines in associated removable shelters during cold weather periods. A controllable heat source is disposed in proximity to the rows of vines to generate heat in the removable shelter during the cold winter periods to heat the air space and the soil inside the removable shelter to a temperature to prevent temperature drops damaging to the vines. The heat source is controlled to maintain a substantially desirable temperature in the removable shelter whereby to permit the precipitation of the growing season during early spring time period to prolong the ripening of the fruits to maturity while providing protection against the risk of spring frost.

According to another broad aspect of the present invention there is provided a system for the cultivation of a particular fruit produced by fruit bearing vines in a climatic region unfavourable to the maturity of the fruit. The system comprises a removable shelter constructed about individual associated rows of the fruit bearing vines to shelter the vines from unfavourable weather conditions. A heat source is provided for heating air and soil in the removable shelter. Control means regulates the temperature of the air and soil to maintain a desirable air temperature in the shelter whereby to protect the vines against damaging cold temperatures and to precipitate the activation of the roots of the vine during early spring time period to prolong the ripening of the particular fruit and to thereby increase the degree days in the immediate environment along the rows of vines.

BRIEF DESCRIPTION OF THE DRAWINGS

A preferred embodiment of the present invention will now be described with reference to the accompanying drawings in which.

MODES FOR CARRYING OUT THE INVENTION

Figure 1:
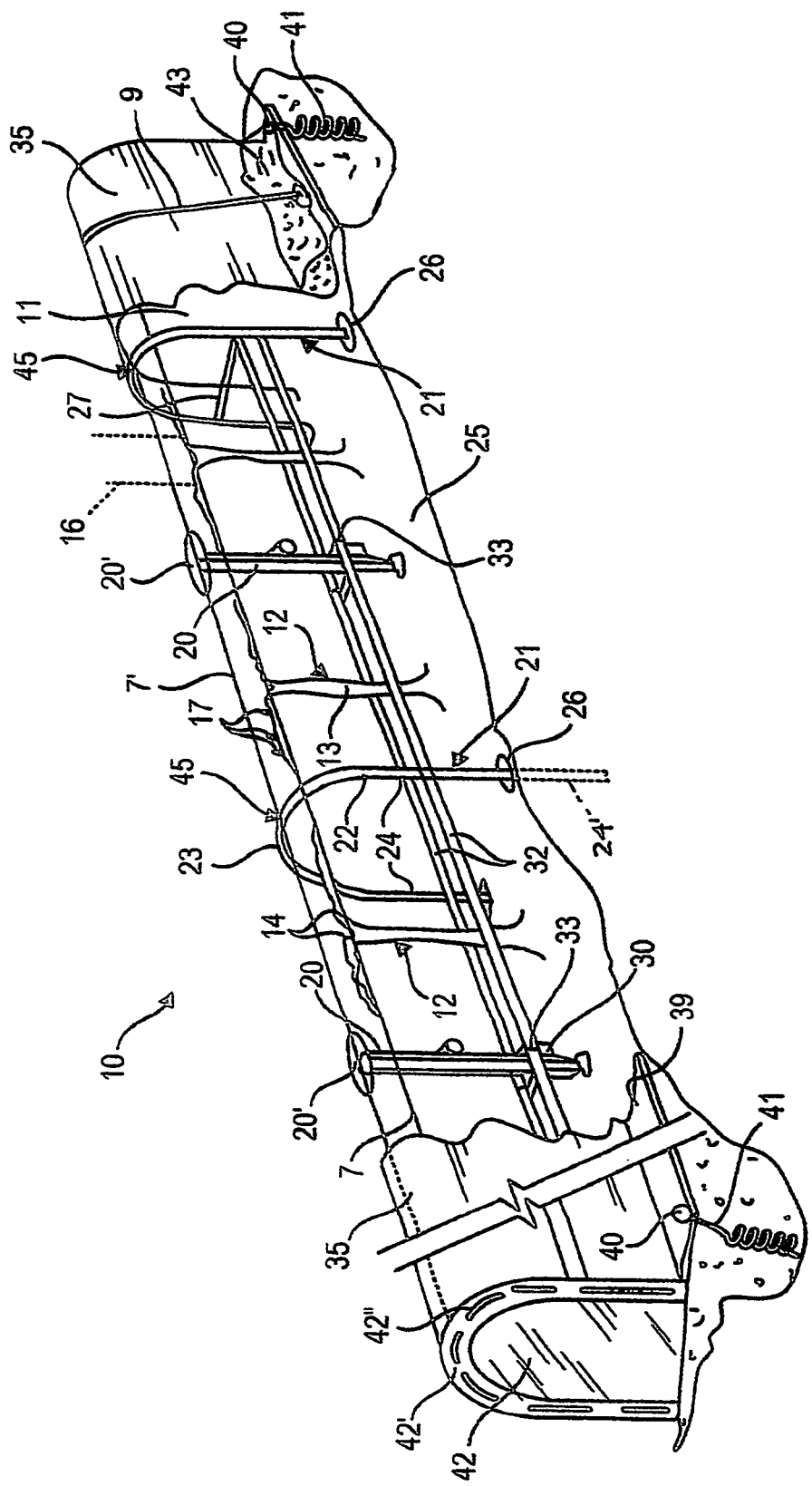
FIG. 1 is a fragmented perspective view illustrating the system of the present invention to carry out the method.
Figure 2A:
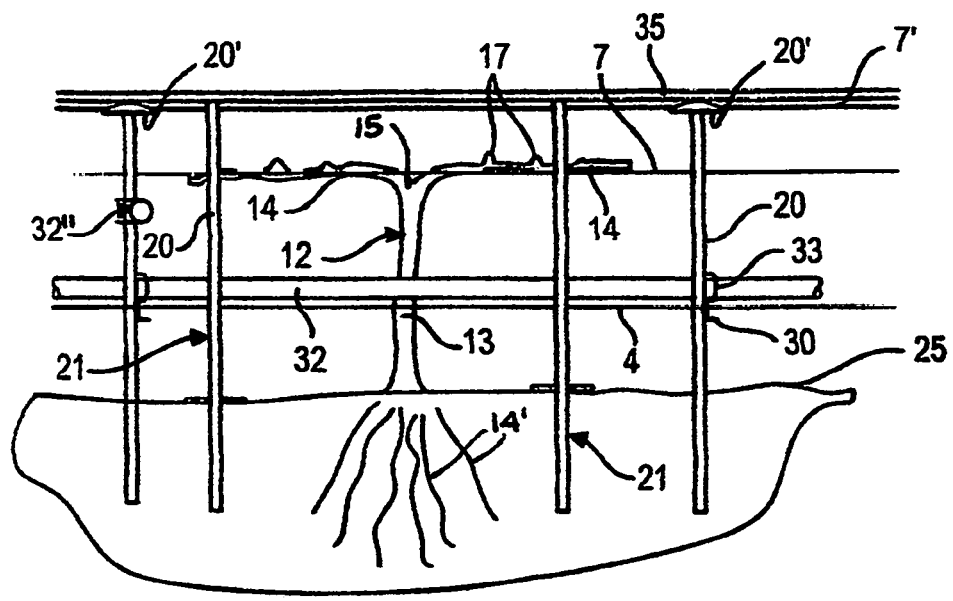
FIG. 2A is a sectional side view showing the tarp support structure over which is supported a protective tarp to entirely cover the a row of vines.
Figure 3:
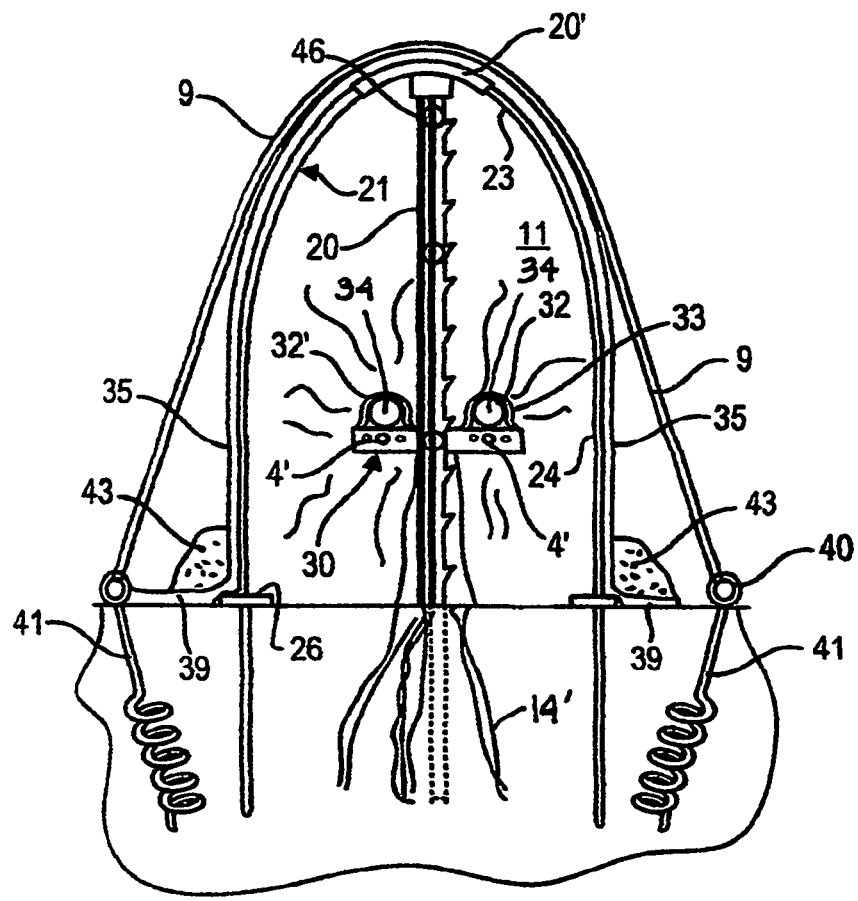
FIG. 3 is an end view illustrating the tunnel-like configuration and component parts of the removable shelter formed over a row of vines.

Referring to FIGS. 1 to 3, there will be described the system and method of the present invention for increasing the degree days in an unfavourable climatic region, for the cultivation of particular fruits grown on vines, herein grape vines of a type which would not resist or be affected by the harsh climatic conditions of the region. Other types of fruits grown on vines can be contemplated by the present invention, such as the cultivation of gooseberries, hardy kiwi, passion fruit and other fruits that require frost free climate. In particular, but not exclusively, the present invention was developed for the growing of vinifera variety grape vines of the European species and those cultivated in the state of California in the United States of America in regions unfavourable to such cultivation due to insufficient degree days. The vinifera variety grape vine requires about ideally between 1400 to 1600 degree days for the full ripening of the grapes to maturity. For this reason, wine produced in climatic zones of the world were climatic conditions are much inferior to 1600 degree days, for example in the region of Quebec, Canada close to the Vermont state line where the average degree days is about 1200, vineyards use rustic vines which can resist to such harsh climate but require a different technique than that of the vinifera variety vines. They also do not produce wine of very good or superior quality as does the vinifera vines.

The pruning technique of the vinifera variety vines, according to the European technique, requires that the shoots of the vines be cut above the cordon(s) of the vines and that shoots or spurs be maintained on the cordons in preparation for the winter period. Attempts have been made in these unfavourable regions, such as in the southern part of the province of Quebec, to grow vinifera variety vines, but they have to date not proved successful although extra care is taken by cutting the cordons at the top of the cane and burying the cane in mixtures of earth, straw and manure and cover the mixture with a fabric sheet before the winter months. Also, the vines are covered with plastic film sheeting in the early spring after unearthing. However, such has resulted in protection of the roots, but the degree days remain insufficient to bring the vines and its grapes to full maturity in these climatic zones. By cutting the cordons more time is necessary for the cordons to re-grow and produce buds. Because the ground is usually still covered with snow and frozen until mid-May, such vines require that the root temperature reach about 12 degree C. before the roots start drawing energy from the ground. This technique has not proved successful and the risk of losing the vines and having a poor production always remain present. The growing season is too short due to insufficient degree days for the growth to full maturity of the grapes of vinifera variety grape vine and thereby obtain the desired superior quality wine.

The technique of the present invention consists in artificially prolonging the growth season in such unfavourable region for the cultivation of the non-rustic vinifera variety grape vines. The present invention is also useful for the cultivation of semi-rustic or the rustic vines, whereby to extend the maturity period for the grapes and to protect the vines against damaging frost and such has been achieved by the present invention. As shown in FIG. 1, the method and system of the present invention comprises the construction of removable shelters 10 over rows of grape vines 12 and controlling the temperature of the air space 11 within the shelters in the immediate environment of the vines. As herein illustrated, these shelters 10 resemble mini-tunnels which are constructed, as will be described herein, and which extend for lengths of 600 feet to cover a great number of the vines.

Figure 2B:
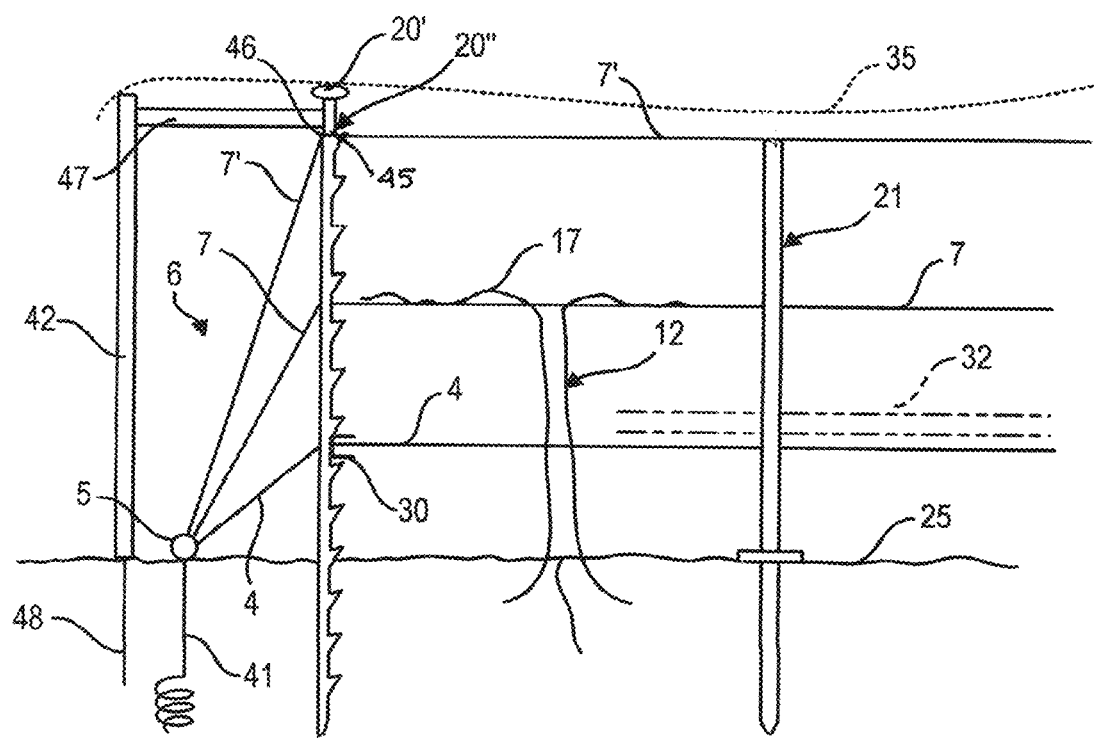
FIG. 2B is a further side view of an end section of the tarp support structure.

With additional reference to FIGS. 2A, 2B and 3, the vines 12 consist of a trunk or cane 13 having roots 14' which project into the ground for distances often exceeding five feet. One or two cordons 14 project from the crown 15 of the cane and are trained to grow horizontally and support wires 7. Shoots 16, a few herein shown in phantom lines in FIG. 1, grow from the buds 17 on the cordons during the summer months and after harvesting the grapes of the vinifera variety, the shoots are cut back on the cordons in the late fall. Figures I and 2 illustrates a vinifera variety grape vine 12 that has been pruned prior to entering the dormant winter period. With the present invention this is the condition of the vine where the present invention begins to simulate an environment to those favourable to its desired climatic condition for its preservation and to make it possible for such vines to produce grapes to their maturity. As shown, rows of grape vines 12 are associated with a trellis system supported on trellis posts 20, such extension trellis, not shown herein, and consisting of wires on which the shoots of the vines are supported as the shoots grow to form a canopy of vines and grape clusters which makes it accessible for the retrieval of the grape clusters in late fall. Such trellis have a series of trellis posts 20, usually steel rods, driven and firmly retained in the ground and to which is secured the wires on which the shoots grasp and extend as they grow. Various configuration of trellis are known in the art.

The removable shelters 10, as illustrated in FIG. 1 is simplified to show the basic construction elements. However, the proper disposition of the frame elements 21 and trellis posts 20 is shown in FIG. 2. The removable shelter consists in the installation of a tarp support structure which comprise a plurality of support frame elements 21 secured along the rows of vines at spaced-apart intervals and disposed transverse to the longitudinal axis of these rows. As herein shown, the support frame elements 21 are each formed from a metal rod 22, herein a steel rod which is formed to define a dome shaped roof support top portion 23 and a pair of straight side arm portions 24. These support frame elements 22 are spaced apart seven feet and are dimensioned whereby the roof support top portion 23 is held disposed spaced above the pruning zone of the rows of the grape vines whereby to provide a space above and around the cordons for the circulation of heat in that area of the removable enclosure to assure that the cordons do not experience temperatures below about minus −12 to −15 degrees C. The support frame elements 21 have a lower portion 24' of their side arms 24 driven into the ground and are arrested by an arresting plate 26 to resist to further penetration by vertical loads placed on the support frame element 21 during winter months due to snow loads. Reinforcing transverse rods 27 may be secured to and across the side arms to prevent snow loads causing them to spread and collapse.

To each of the trellis posts 20 is rigidly secured a conduit support cross-arm 30 which is spaced a predetermined distance, herein about twelve inches above the ground surface 25 and under the outwardly extending cordons 14 of the vine. To each arm section 31 of the cross-arm 30 there is supported liquid circulation conduit 32 which is firmly retained thereon by a clamp or attachment wires 33 provided in pre-drilled holes in the cross-arms 30. These conduits 32 are PVC conduit of 1⅝ inch diameter and are supported by a plurality of these posts 20 which are aligned with the canes 13 all along a row of vines. The liquid circulation conduit 32 and 32' are part of a loop in which heated liquid 34, herein glycol, is convected as will be described further. The conduits 32 and 32' are held substantially parallel to one another and spaced from the cane 13 of the vine a predetermined distance not to overheat the cane and thereby stimulate the vines at the wrong time. Also, their location is spaced from the tarp 35 not to melt the snow accumulated thereon to diminish the thermal insulating property of the snow.

The trellis posts 20, as herein shown, have been reduced in length, with a top extension portion having been removed, and this is done in the fall, to fit the posts 20 within the removable shelters 10 which is about 3 feet high. During the growing season the extension sections are re-secured to the top end thereof to approximately double their length to about 6 feet and to which wires are secured for support of the shoots of the cordons. The support frame elements remain permanently in position and are not removed during the active period of the vines as their wire structure does not pose any obstacle to the vines.

Figure 4:
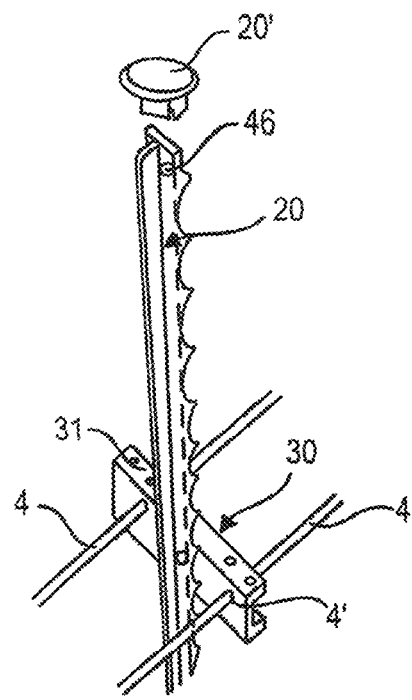
FIG. 4 is a fragmented perspective view of a trellis post of the support structure on which is supported the heating conduits.

A top wire 7' is attached centrally on top of each post 20 by suitable attachment means, herein a twist type wire attachment 45. The wire 7' extends through a hole 46 (see FIG. 3) in an end post 20" (see FIG. 2B) and at an angle to the ground anchor 5 to maintain all of the support frame elements 21 interconnected together by a tensioned steel wire 7'. A pair of wires 4 extend through holes 4' (see FIG. 4) formed in the cross-arm 30 to each side of the trellis posts 20 all along the shelter 10 and through the cross-arm 30 of the end posts to also secure to the anchor 5 to further solidify the structure by applying tension on the wires 4. End walls 42 constructed of plywood or other suitable material, are anchored at their base in the ground by suitable pin anchors 48 and connected at the top by a brace arm 47 constructed of wood or any suitable material.

In preparation for the cold harsh winter months, in late fall after the grapes have been harvested, it is time to position a protective tarp 35 over the rows of vines and supported on top of the support frame elements 21 and the trellis posts 20. The top extension of the trellis posts 20 is removed and to prevent the trellis posts 20 from puncturing the tarp 35, when a load caused by snow or freezing rain is deposited on the tarp during the winter period, a protective cap 20' is mounted on top of each post 20. These posts 20 are disposed intermediate the support frame elements 21 and thus the reason for mounting the protective caps 20' as the tarp will sag between the support frame elements and the vines. As shown in FIG. 3, elastic cords 9 are secured disposed across the tarp 35, in line with the protective caps which prevent the tarp from collapsing, to further secure the tarp in position and arrest the tarp from flapping due to strong winds. The elastic cord 9 is anchored at opposed ends 8 to opposed sides of the shelter, into the ground or secured to the existing ground attachments 40, which will be described below.

Figure 7:
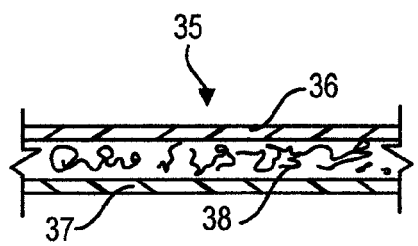
FIG. 7 is a cross-section view showing the construction of the hybrid tarp.

The protective tarp may have several constructions, but for the present invention a tarp has been developed to achieve desired results. To this end, as shown in the cross-section view of FIG. 7, the tarp is a hybrid tarp formed as a composite structure comprised of a light reflecting outer sheet 36 of white color and a dark tone inner sheet 37 of black color. A fabric material having thermally insulating properties, herein a felt material 38, is sandwiched between the outer sheet 36 and the inner sheet 37. The purpose of the white outer sheet is to reflect sunlight during the winter months not to overheat the inside space of the shelters 10 and melt the snow deposited thereon. The purpose of the dark inner sheet 37 is to maintain the vine dormant in a dark control temperature environment where there is no sunlight whereby to maintain the roots in a dormant state.

The tarp 35 consists of an elongated rectangular composite sheet stored in roll form and supported by a machine (not shown but forming part of a related patent application) and deployed over a row of vines. As the machine is displaced along the service pathways to the side of the rows of grapevines, the tarp is unwound over the support frame elements and posts 20. The tarp has a predetermined width whereby the tarp extends over the rows of vines and has opposed side edge end portions 39 forming a skirt to rest on the ground to each side of the rows for securement thereof to ground attachments 40 already anchored in the ground by screw ground anchors 41. As the tarp is unwound, the tarp is attached to the ground anchors to provide for a taunt tarp covering. Once the row of vines is fully covered by their tarp 35, the end walls 42 are secured to the end one of the shelter as shown in FIG. 2B, and end portions 42' of the tarp 35 are folded along the outer edge of the end wall and secured thereto by short wood pieces 42" to form an end closure. In order to form a seal between the opposed side end portions 39 of the tarp and the ground surface to prevent the escapement of heat from the shelters 20, earth 43 or other type material or weight elements are disposed over the skirt side end portions 39 of the tarp side walls. Of course, during the winter, snow will cover the ground and provide a seal for the tarp all around the shelter. Because vines are planted in side-by-side rows, snow will also accumulate in the troughs formed between the rows and the snow will provide excellent insulation for the shelters and the vines.

Because the red wine variety grape vines require a longer time for the ripening of the grapes in early spring the soil in the area of the roots of the vines is heated sooner, using geothermal heat energy, to a temperature of about +10 to +12 degrees Celsius. One or more temperature probes 3, see FIG. 3, are disposed in each shelter and transmit soil temperature signals to the controller 49 (FIG. 5) described later. As previously mentioned, in order to artificially prolong the growing season for the fruit vines, such as the vinifera variety grape vine, it is important to simulate the climatic conditions, in the immediate environment of the vines, early in the spring season for these vines to develop their grapes to maturity. Therefore, the control of temperature in the immediate environment of the vines during cold weather conditions and in early spring is an essential aspect of the method and system of the present invention. During winter, for the vinifera variety vines, the cordons should not be subjected to temperatures below −15 degrees C. and the roots should not be subjected to temperatures below −10 degrees C. in order not to be affected by the frost.

Figure 5:
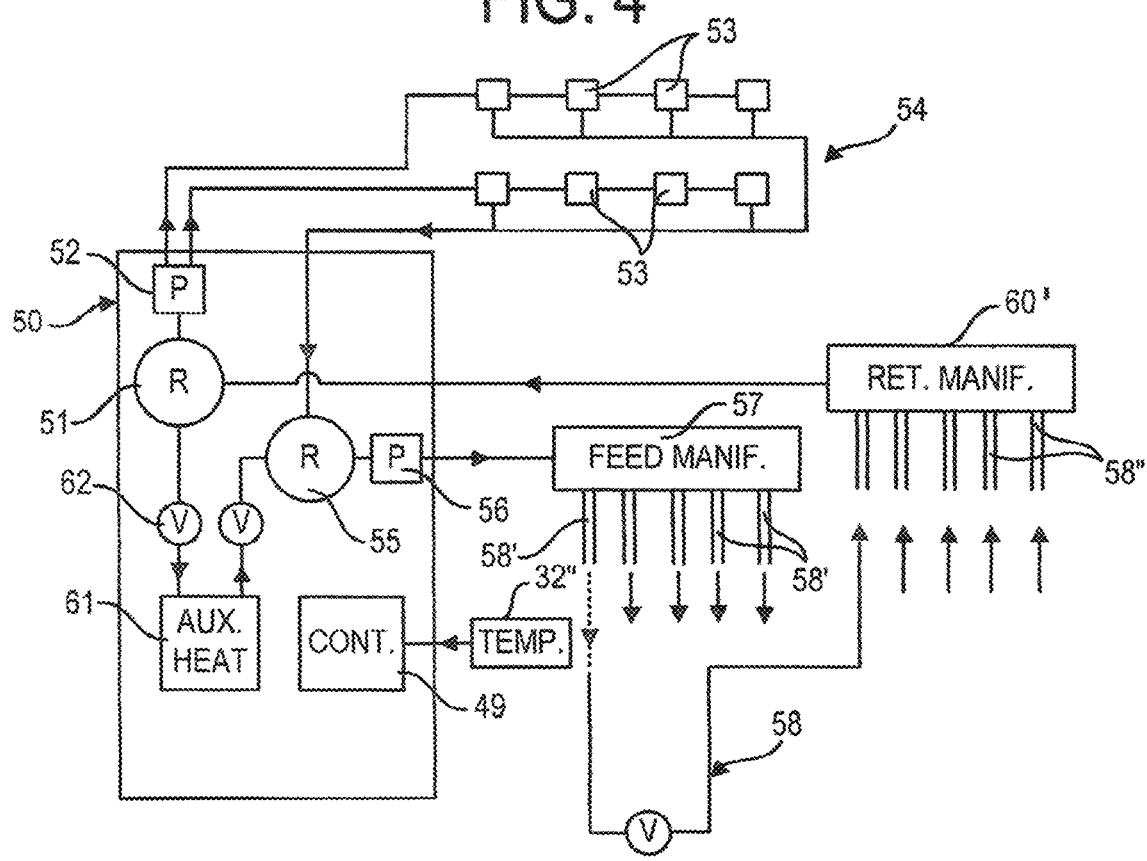
FIG. 5 is a simplified flow diagram illustrating the glycol heating system and its heat sources as well as the heated liquid distribution network in the vineyard.

As above described the removable shelters are equipped with liquid circulation conduits 32 through which a heated liquid, herein glycol, is convected in the conduits, herein PVC tubes, to generate radiant heat in the air space 11 within the shelters 10 and on the ground. As illustrated in FIG. 3, radiant heat is generated about these conduit which are spaced from the ground 25, the canes 13 of vines, and the cordons 14 of the vines whereby radiant heat will prevent the ground and the roots under the canes from freezing to a damaging temperature in winter months and to maintain an inner temperature environment of about −10 to −12 degrees C., which is an ideal winter temperature for the well-being of the roots and cordons of the vines, particularly the vinifera variety vines. Therefore, it is important to monitor the temperature inside the shelters 10 and in the soil to control the heat source, by supplying heated liquid in the liquid circulation conduits 32 when needed. Temperature sensors 32" are conveniently and strategically mounted inside the shelter to feed sensed temperature signals to a programmable controller 49 which effects necessary adjustments to the heat source to maintain a desired temperature of about −10 to −12 degrees C. inside the shelters. During very cold winter periods the temperature of the glycol can be raised to about +12 to +15 degrees Celsius to maintain the tunnel temperature to about −10 to −12 degrees C. FIG. 5 illustrates an example of such as system.

Figure 6:
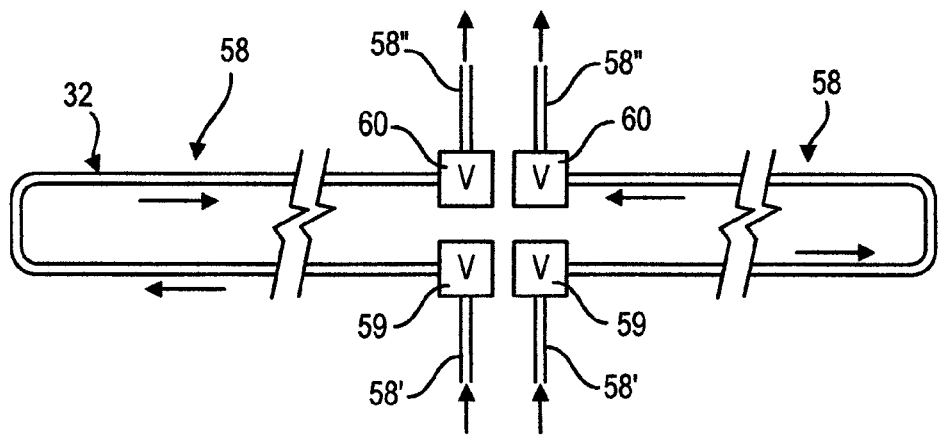
FIG. 6 is a further flow diagram illustrating a single heating circuit formed by a pair of liquid circulation conduits and associated valves.

As shown in FIGS. 5 and 6, there is provided a vineyard control enclosure 50 in which there is housed one or more glycol holding tanks 51, auxiliary heating system 61, valve networks and a controller panel 49 to control and monitor the heating network throughout the vineyard. The controller 49 has a display panel, not shown but obvious to a person skilled in the art. The heating system, to heat the glycol circulated through the liquid circulation conduits 32, may have many forms and different type heating devices. As a heat source for the system herein described, a pump 52 circulates the glycol in the tank 51 through a plurality of underground geothermal wells 53 of a geothermal heat recovery system 54, schematically illustrated herein. The conduit system associated with the wells lies underground below the frost lime to about 7 feet and protected in foam material casings. Heated glycol from the geothermal wells 53 is accumulated in a feed reservoir 55 and pumps 56 feeds the glycol under pressure to a plurality of distribution feed manifolds 57 to which is connected a plurality of conduit loops 58 and pumps (not shown) associated with liquid circulation conduits 32, as schematically illustrated in FIG. 6.

The distribution feed manifolds 57 are also buried underground in insulating foam casings not illustrated herein and have feed conduits 58' feeding associated conduit loops 58. As shown in FIG. 6, the feed conduits 58' are coupled to the conduit loops 58 through a mechanical valve 59 at the inlet end of the loop 58 and a further valve 60 at the outlet end. These valves 59 and 60 are adjusted to control the flow rate of the heated glycol to each loop depending on the configuration of the removable shelter. That is to say, if the shelter is for example, 600 feet long and located on a slope, heat will tend to propagate towards the top elevated end of the shelter. If there are two or three of these conduit loops 58 disposed in end-to-end alignment along the shelter 10, the valve at the lower end will be adjusted whereby the lower loop will generate more heat (higher flow Rate) and the valves of the other loops at the upper end will be adjusted to generate less heat (lower flow rate) to substantially balance the temperature along the tunnel-like shelter. The outlet end 58" of each of the conduit loops 58 are coupled to a return manifold where the glycol is fed to the holding tank 51 to be re-circulated through the geothermal heat recovery system 54 where it is heated again.

During very cold winter days, the geothermal heat recovery system 54 may not be sufficient to heat the glycol to a temperature to maintain the desired average of −12 degree C. of the air in the shelters 10. For this reason there is provided back-up heating devices 61 which are automatically switched into the system by the controller 49 through associated valves 62. These back-up devices may include heat pumps, and gas or electric heating devices, well known in the art. The switch over is be effected automatically by the controller software which monitors the temperature in each of the shelters 10 or it could be done manually by operating the valves 62 and shutting the pump 52 off. It is also pointed out that the geothermal system can also be used to cool the shelters, by heat exchangers, should the temperature therein start climbing to an unacceptable hot level. Also, by removing the end panels or walls 42 of these mini-tunnel like shelters, an air draft can be automatically established along the shelter 10.

Summarizing, the method of operation of the system, the degree days for the cultivation of particular fruits produced by fruit bearing vines in an unfavourable climate is made possible by sheltering rows of vines in associated removable shelters 10 during cold weather periods. A controllable heat source, such as the system illustrated in FIGS. 5 and 6, is disposed in proximity to the rows of vines to generate hot glycol which is circulated in liquid circulation conduits 32 to heat the air space and ground inside the removable shelters in winter months to heat the shelters to a controlled temperature of about −12 degrees C. This heat is important to preserve the shoots or spurs 17 on the cordons 14 of the vine during winter months. The heat also heats the soil around the cane and penetrates into the surface of the ground to prevent the roots of the vine from freezing. The roots of these vines can support temperatures down to about minus 10 degrees C., but lower temperature could kill the vine. Therefore, it is important to maintain the temperature of the soil of the roots above −10 degrees C. Also, overheating the roots could stimulate the roots to start drawing energy from the ground too soon and again be disastrous for the vine. Therefore, careful temperature control is necessary and very important, thus the use of temperature probes to monitor soil temperature to make adjustment to the temperature of the fluid as necessary.

Because the tarp 35 has a white light reflecting outer surface it prevents the sunrays from over-heating the shelters in winter and melting snow thereon and preventing snow build-up which provides an insulation covering for the shelters in winter. The black dark inside color of the tarp also keep the roots of the vines dormant as the vines need to rest during winter months. The dark inner surface and the felt mid-layer traps heat inside the shelters.

Figure 8:
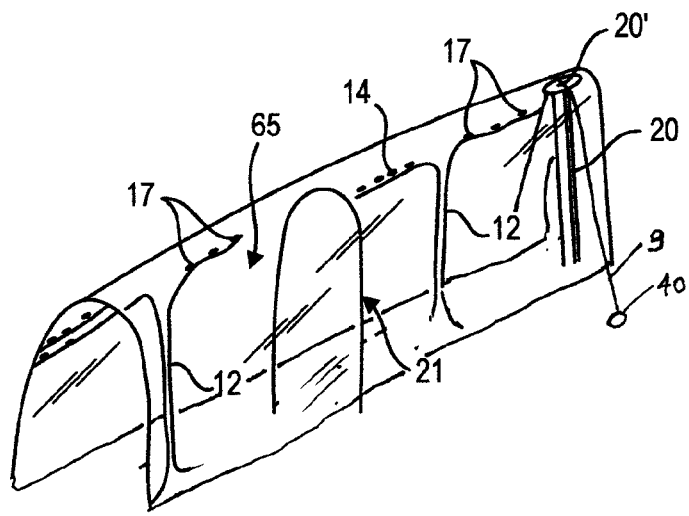
FIG. 8 is a perspective view showing the transparent tarp cover disposed over the vines on the tarp support structure.

In early spring, towards the end of March or early April, the soil temperature about the roots is raised to about +12 degrees C. to activate the roots while the soil outside the shelters is still frozen. At an appropriate time, the tarp 35 is removed and replaced by a transparent plastic sheet 65, such as a polyethelene sheet 65, see FIG. 8, whereby the sun rays can penetrate to create a micro-climate to heat the soil and activate the vine by getting the sap flowing. The sheet is shorter than the tarp to provide ventilation of the plants and is retained by the elastic cords 9 as shown in FIG. 8. The heating system is still operative and on stand-by to counter any cold nights or days during this unpredictable early spring period in these climatic zones. These transparent sheets 65 are very temporary and easily installed and may be peeled back by removing the cords 9 to fully expose the vines during unusually warm spring days. The transparent sheet 65 is simply left on the ground next to the row of vines and re-installed when necessary to do so. These tarps are removed in the month of June when the flowers on the buds or spurs 17 of the cordons 14 start showing. With this technique, there is a gain of 3 weeks added to the front end of the ripening season. As mentioned above, all of the red wine producing vines have their roots heated by heating the soil to +12 degrees C. at the beginning of spring. With respect to the white wine producing grapes, it is not so crucial.

Accordingly, with the method and system of the present invention it is possible to extend the degree days in the immediate environment of the vines for the cultivation of the vinifera variety vines in non-favourable regions on the planet, which do not have sufficient degree days to permit the cultivation of rustic, semi-rustic or non-rustic fruit bearing vines which require from anywhere between 1400 to 1600 degree days and where it was not heretofore possible. As an example, presently, in the Brome-Missisquoi region of Quebec, Canada, close the Vermont state line, and at a latitude similar to the region of Bordeaux, France where the finest wines of the world are based on Cabernet Sauvignon, there is an experimental vineyard where research and experimentation was conducted to develop the system of the method and present invention. 28,000 meters of removable shelters were installed on 40,000 vines planted spaced-apart by 70 cm and heated as described above during the cold winter months. This restricted experimental vineyard has now successfully grown, in a confidential environment, vinifera variety grape vines using the present invention where the degree days in the shelter were extended. With the present invention it was possible to grow to maturity vinifera grapes whereby to produce quality wines such as Chardonnay, Gewerztraminer, Riesling, Pinot, Merlot and Cabernet Sauvignon.

It is within the ambit of the present invention to cover any obvious modification of the embodiment described herein provided such modifications fall with the scope of the appended claims.

The invention claimed is:

1. A system utilizing a removable shelter having two different types of tarps for use at different periods for the cultivation of a particular fruit produced by rows of fruit bearing vines in a climatic region unfavourable to ripening of said fruit to maturity and wherein there is damaging frost in the ground in cold winter months preventing said fruit bearing vines to reach said maturity, said system comprising said removable shelter being adapted to be constructed about individual associated rows of fruit bearing vines to shelter said rows of fruit bearing vines from unfavourable weather preventing the ground in the area of the roots under the canes of the fruit bearing vines from freezing to a damaging temperature in winter months, a tarp support structure formed by a plurality of support elements, said plurality of support elements being secured spaced-apart along said rows of fruit bearing vines, one of said two different tarps being a protective tarp adapted to be disposed entirely over said plurality of support elements and in contact with the ground surface on opposed sides of said rows of fruit bearing vines and retained over said plurality of support elements to form a closed environment for said associated rows of fruit bearing vines during said cold winter months when frost is present in said ground, said protective tarp having an inner surface of a color to create a dormant environment for said rows of fruit bearing vines during said cold winter months, a controllable heat source for heating a liquid circulated in liquid circulation conduits for heating air and said ground in said removable shelter, said liquid circulation conduits being supported a predetermined distance to said rows of fruit bearing vines and spaced above said ground for heating said ground and air above said ground inside said removable shelter during said cold weather months, and a controller to control heat released by said controllable heat source to regulate the temperature of said air and said ground in said removable shelter to maintain a desirable air temperature in said shelter and said ground during said cold winter months and wherein the other of said two different tarps is a light transmitting tarp provided for replacement of said protective tarp in early spring to re-shelter said rows of fruit bearing vines to permit sun rays to penetrate into said removable shelter to heat the soil and activate said fruit bearing vines and to shelter said rows of fruit bearing vines against the risk of spring frost and removing said light transmitting tarp when there is no risk of spring frost to prolong ripening of said fruit by increasing degree days during said early spring in an environment along said rows of vines for said fruit to ripen to maturity during fall when said fruit is harvested.

2. The system of claim 1 wherein said liquid circulation conduits are supported in alignment with said vine canes all along said rows of said fruit bearing vines, and wherein said controllable heat source comprises a liquid holding tank for supplying liquid to said recirculation conduits and a liquid circulation pump to circulate said heated liquid in said conduits, said controller regulating the temperature of said air by controlling a flow regulating valve secured to said liquid circulation conduits to regulate the flow rate of said heated liquid in said liquid circulation conduits.

3. The system of claim 2 wherein there is further provided temperature sensors to sense the temperature of the air and soil in said removable shelter, said controllable heat source heating said liquid to a desirable liquid temperature to maintain a desirable temperature of the ground near said roots and said air in said shelter.

4. The system of claim 1 wherein said particular fruit of said fruit bearing vines is a grape from a non-rustic vinifera variety grape vine, semi-rustic and rustic grape vine, each of which require between approximately from 1200 to 1600 degree days for full maturity of said grape depending on the selected type of said grape vines.

5. The system of claim 4 wherein said plurality of support elements are each formed from a rod which is formed to define a dome shaped roof support portion disposed spaced above a pruning zone of said rows of said fruit bearing vines and a pair of straight side arm portions with said opposed side arm portions being anchored in said ground on opposed sides of said rows of said fruit bearing vines.

6. The system of claim 5 wherein said tarp support structures comprise a trellis structure to which is secured said conduit supports for supporting a pair of said liquid circulation conduits, and a wire having connections to to secure said plurality of said support elements for interconnecting said plurality of support elements to one another in a stationary spaced-apart relationship.

7. The system of claim 6 wherein said conduit supports are secured to a vertical support post of said tarp support structure, said vertical support post being disposed between said fruit bearing vines, and a cross-arm secured to said conduit supports and spaced a predetermined distance above said outer surface of said ground and under outward extension cordons of said vine cane, one of said liquid circulation conduits being secured to said cross-arm to each side of said vertical post, said liquid circulation conduits being disposed in substantially parallel relationship to one another and being interconnected at one of their ends disposed inside said removable shelter, one of said liquid circulation conduit being connected at an opposed end to a heated liquid supply reservoir and the other of said liquid circulation conduit being connected at an opposed end to a return liquid reservoir, and wherein said controllable heat source further comprises a flow regulating valve secured to one of said liquid circulation conduit and controlled by said controller to control the flow rate of said heated liquid in said liquid circulation conduit.

8. The system of claim 5 wherein said protective tarp has a composite structure comprised of a light reflecting outer sheet and a dark tone inner sheet interconnected together, said light reflecting outer sheet providing for the reflection of sunlight during said cold winter months and said dark tone inner sheet maintaining said vines dormant during said cold winter months in a dark heated environment.

9. The system of claim 8 wherein said tarp outer and inner sheets are interconnected through an insulating mid-layer sandwiched between said outer and inner sheets, said midlayer being formed of a felt fabric material.

10. The system of claim 4 wherein said controllable heat source is comprised of a geothermal in-ground liquid circulation system to extract heat from said ground, a pump circulating liquid in said in-ground liquid circulation system, and a heated liquid distribution manifold insulatingly buried in ground and to which is secured distribution conduits constituting said heated liquid supply.

11. The system of claim 10 wherein said liquid is a glycol liquid capable of maintaining its liquid state during cold winter temperatures, and wherein there is further provided one or more back-up heating sources to heat said glycol to a desired temperature when said geothermal in-ground liquid circulation system is insufficient.

12. A system utilizing a removable shelter having two different types of tarps for use at different periods for the cultivation of a particular fruit produced by rows of fruit bearing vines in a climatic region unfavourable to ripening of said fruit to maturity and wherein there is damaging frost in the ground in cold winter months preventing said fruit bearing vines to reach said maturity, said system comprising a removable shelter adapted to be constructed about individual associated rows of fruit bearing vines to shelter said rows of fruit bearing vines from unfavourable weather conditions preventing the ground and the roots under the canes from freezing to a damaging temperature in winter months a tarp support structure formed by a plurality of support elements, said plurality of support elements being secured spaced-apart along said rows of fruit bearing vines, one of said two different tarps being a protective tarp adapted to be disposed entirely over said plurality of support elements and in contact with the ground surface on opposed sides of said rows of fruit bearing vines and retained over said plurality of support elements to form a closed environment for said associated rows of fruit bearing vines during said cold winter months when frost is present in said ground, said protective tarp having an inner surface of a color to create a dormant environment for said rows of fruit bearing vines during said cold winter months, a controllable heat source for heating a liquid circulated in liquid circulation conduits for heating air in said removable shelter to a temperature of −10 to −12 degrees C. to prevent temperature drops from damaging said vines, said liquid circulation conduits being supported a predetermined distance to said rows of fruit bearing vines and spaced above said ground for heating said ground and air above said ground inside said removable shelter during said cold winter months, and a controller to control heat released by said controllable heat source to regulate the temperature of said air and said ground in said removable shelter to maintain a desirable air temperature in said shelter and said ground during said cold winter months, and wherein the other of said two different types of tarps is a light transmitting tarp provided for replacement of said protective tarp in early spring to reshelter said rows of fruit bearing vines to permit sun rays to penetrate into said removable shelter to heat the soil and activate said fruit bearing vines and to shelter said rows of fruit bearing vines against the risk of spring frost and removing said light transmitting tarp when there is no risk of spring frost to prolong ripening of said fruit by increasing degree days during said early spring in an environment along said rows of vines for said fruit to ripen to maturity during fall when said fruit is harvested.

13. The system of claim 12 wherein said ground said removable shelter surrounding said roots is heated to a temperature of about +12 degrees C. in very early spring time.

* * * * *